(12) United States Patent
Kim

(10) Patent No.: US 11,400,626 B2
(45) Date of Patent: Aug. 2, 2022

(54) 3D INJECTION MOLDING APPARATUS AND INJECTION MOLDING METHOD

(71) Applicant: Joo-Hyoung Kim, Ansan-si (KR)

(72) Inventor: Joo-Hyoung Kim, Ansan-si (KR)

(*) Notice: Subject to any disclaimer, the term of this patent is extended or adjusted under 35 U.S.C. 154(b) by 68 days.

(21) Appl. No.: 16/809,202

(22) Filed: Mar. 4, 2020

(65) Prior Publication Data

US 2020/0307044 A1    Oct. 1, 2020

(30) Foreign Application Priority Data

Mar. 29, 2019 (KR) ........................ 10-2019-0037093

(51) Int. Cl.
*B29C 45/00* (2006.01)
*B29C 45/03* (2006.01)
*B29K 101/12* (2006.01)

(52) U.S. Cl.
CPC .......... *B29C 45/0053* (2013.01); *B29C 45/03* (2013.01); *B29C 2045/0079* (2013.01); *B29K 2101/12* (2013.01)

(58) Field of Classification Search
CPC ...... B29C 2045/0079; B29C 2791/006; B29C 2791/007; B29C 2795/002; B29C 45/0053; B29C 45/03; B29C 45/20; B29C 45/63; B29C 51/02; B29C 51/10; B29C 51/16; B29C 51/445; B29C 2045/1729; B29C 45/34; B29C 45/1753
USPC ...................................................... 425/129.1
See application file for complete search history.

(56) References Cited

U.S. PATENT DOCUMENTS

| 2010/0060134 A1* | 3/2010 | Saito | ........................ | B29B 7/845 |
| | | | | 313/113 |
| 2017/0259479 A1* | 9/2017 | Debruin | .............. | B29C 45/1753 |

FOREIGN PATENT DOCUMENTS

| JP | S6325011 A | * | 2/1988 | ............. | B29C 45/02 |
| JP | 2004-050459 A | | 2/2004 | | |
| KR | 10-1988-0010887 A | | 10/1988 | | |
| KR | 10-2013-0051737 A | | 5/2013 | | |
| WO | WO-2014133206 A1 | * | 9/2014 | ............ | B41F 16/008 |

OTHER PUBLICATIONS

WO2014133206A1—Machine Translation (Year: 2014).*
JPS6325011A—Machine Translation (Year: 1988).*
Korean Office Action for related KR Application No. 10-2019-0037093 dated May 1, 2019 from Korean Intellectual Property Office.

* cited by examiner

*Primary Examiner* — Yunju Kim
(74) *Attorney, Agent, or Firm* — Paratus Law Group, PLLC

(57) ABSTRACT

Disclosed are a three dimensional injection molding apparatus and an injection molding method which are capable of manufacturing an injection molded product having patterns, colors, and textures which are high quality by injection molding after completely removing a gas included in a melted resin, and transferring a surface layer for expressing the patterns, colors, and textures to the injection molded product.

1 Claim, 15 Drawing Sheets

3D INJECTION MOLDING APPARATUS AND INJECTION MOLDING METHOD

CROSS-REFERENCE TO RELATED APPLICATION

This application claims priority to and the benefit of Korean Patent Application No. 10-2019-0037093, filed on Mar. 29, 2019, the disclosure of which is incorporated herein by reference in its entirety.

BACKGROUND

1. Field of the Invention

The present invention relates to injection molding, and specifically, to an injection molding apparatus, which is capable of manufacturing an injection molded product having high quality of pattern, color, and texture by injection molding after completely removing a gas included in a melted resin and transferring a surface layer for expressing the pattern, color, and texture, and an injection molding method.

2. Discussion of Related Art

Many products used in daily life are manufactured by molding plastic, and among the products, electronic devices, such as smartphones and tablet personal computers (PCs), which have become daily necessities of modern people, have become means to express beautiful individualities beyond just serving to carry out functions.

Accordingly, needs for studies about an injection molding method capable of realizing textures and colors like those of real materials such as a metal, wood, and leather on the products are growing.

A transfer in-mold injection molding method, which is one plastic molding method in relation thereto, is a technology which is applied to mobile phone covers, control panels, vehicle interior and exterior materials, control panels and components of various electronic devices, and plastic products of which surfaces need to be decorated and through which the plastic products of which surfaces are decorated with complex prints, graphics, or patterns may be manufactured through only one injection molding process when compared to a conventional method in which a plurality of processes, such as a printing process and a post process which decorate a surface, are performed after a synthetic resin is injection molded.

However, since surface quality of the products which are injection molded through the transfer in-mold injection molding method according to the conventional technology is not high, it has been difficult to realize feelings of textures and colors of real materials without change.

SUMMARY

The present invention is directed to providing an injection molding apparatus, which is capable of manufacturing an injection molded product having high quality of pattern, color, and texture by injection molding after completely removing a gas included in a melted resin and transferring a surface layer for expressing the pattern, color, and texture, and an injection molding method.

According to an aspect of the present invention, there is provided an injection molding apparatus including a supply unit configured to supply a thermoplastic resin, a heating unit configured to heat the thermoplastic resin supplied from the supply unit to be melted as a melted resin, an injection unit configured to inject the melted resin melted by the heating unit, a print unit configured to form a surface layer on a surface of a film, and a mold unit configured to mold the melted resin injected from the injection unit into an injection molded product, receive the film on which the surface layer is formed from the print unit, and transfer the surface layer of the film to the injection molded product, wherein an injection module configured to receive the melted resin and inject the melted resin into the mold unit is formed in the injection unit, wherein, before the melted resin is injected, a gas is evaporated and discharged from the melted resin, and the injection module includes a main body which is formed to have a cylindrical shape having an inner space and has a hollow and a wall in which a plurality of gas discharge holes are formed to discharge the gas evaporated from the melted resin passing through the inner space to the outside, a spray head coupled to a front end portion of the main body and including a nozzle configured to spray the melted resin supplied through the inner space of the main body, a guide member which is installed along a central portion of the inner space of the main body in a longitudinal direction of the main body and in which a first guide groove and a second guide groove formed in the longitudinal direction are alternately disposed in parallel in an outer circumferential surface in a circumferential direction so as to guide the melted resin supplied from a rear end portion of the main body to flow to the front end portion of the main body, wherein a front end portion of the first guide groove is open, a rear end portion of the first guide groove is closed, a front end portion of the second guide groove is closed, and a rear end portion of the second guide groove is open so that the melted resin supplied from the rear end portion of the main body flows along the second guide groove, stops at the front end portion of the second guide groove, and overflows and is introduced into the first guide groove such that the gas included in the melted resin is evaporated when the melted resin overflows and is introduced into the first guide groove from the second guide groove, and a plurality of discharge members which are formed to have flat ring shapes having hollow central portions to wrap an outer side of a section of the guide member in which the first guide groove and the second guide groove are formed, and are fitted to the guide member to be adjacent to each other, and in which a first protrusion and a second protrusion are formed to protrude from an outer side and an inner side of one surface of the discharge member in a circumferential direction to be spaced apart from each other with a gas chamber formed in a separation space therebetween, wherein a plurality of discharge holes are formed in the first protrusion, a plurality of discharge slits radially formed are provided in the second protrusion, and a height of the second protrusion is lower than a height of the first protrusion so that the gas evaporated from the melted resin is allowed to be introduced into the gas chamber.

In this case, the discharge member may be divided into a plurality of pieces.

In addition, eject holes may be further formed to pass through the wall of the main body in the longitudinal direction and intersect the gas discharge holes, the injection module may further include a hub box which is formed to have a ring shape along the front end portion of the main body and communicates with the eject holes of the main body, and a suction member provided with a plurality of suction hoses radially connected to the hub box to suction air of the eject holes at a high speed using a vacuum suction force of a vacuum pump, a high speed air flow may be generated through the suction member in the eject holes using the vacuum suction force of the vacuum pump so that the gas included in the melted resin is guided to be evaporated and discharged with air flowing at a high speed.

In addition, porous wire bars manufactured by weaving fine wires may be inserted into the eject holes so that the vacuum suction force of the suction member uniformly acts in the inner space of the main body.

Meanwhile, according to an aspect of the present invention, there is provided an injection molding method including: manufacturing, by a print unit, a molding film; discharging, by an injection unit, a gas from a melted resin and injecting the melted resin into a mold unit; transferring a surface layer of the molding film to an injection molded product by inputting the molding film and the injection molded product, which is primarily molded using the melted resin from which the gas is discharged, to the mold unit; and obtaining the injection molded product by removing an unnecessary portion of the film from the injection molded product to which the surface layer of the film is transferred, wherein, in the discharging, by the injection unit, of the gas from the melted resin and the injecting of the melted resin to the mold unit, the gas is discharged from the melted resin using the injection module of the injection molding apparatus of claim 1.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION

Figure 1:
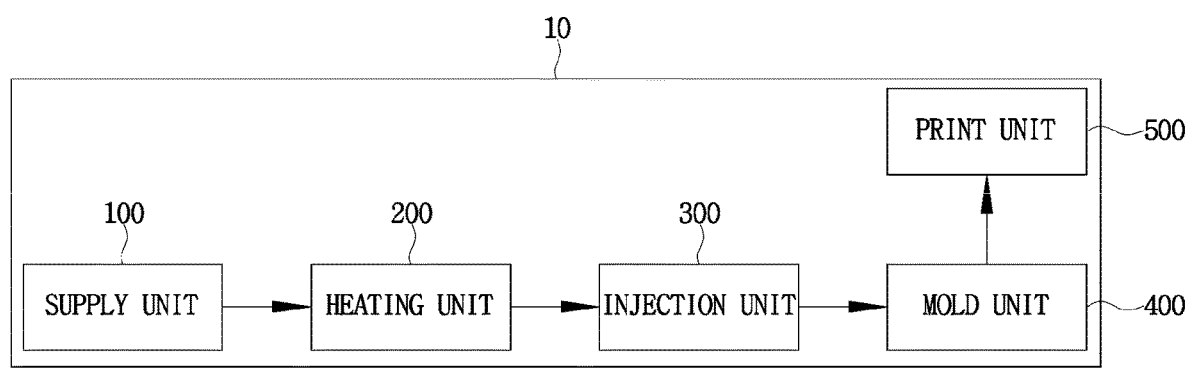
FIG. 1 is a block diagram illustrating an injection molding apparatus according to an embodiment of the present invention.

An injection molding apparatus and an injection molding method according embodiments of the present invention will be described in detail with reference to the accompanying drawings. Since the present invention allows for various changes and numerous embodiments, specific embodiments will be illustrated in the drawings and described in detail in the written description. However, this is not intended to limit the present invention to specific embodiments, and it is to be appreciated that all changes, equivalents, and substitutes that do not depart from the spirit and technical scope of the present invention are encompassed in the present invention. Like numbers refer to like elements throughout the description of the figures. In the accompanying drawings, sizes of structures may be greater than those of actual structures for clarity of the present invention or may be smaller than those of the actual structure such that a schematic structure of the present invention is understood.

It will be understood that, although the terms "first," "second," etc. may be used herein to describe various elements, these elements should not be limited by these terms. These terms are only used to distinguish one element from another. For example, a first element could be termed a second element, and a second element could similarly be termed a first element without departing from the scope of the present invention. Meanwhile, unless otherwise defined, all terms including technical and scientific terms used herein are to be interpreted as is customary in the art to which this invention belongs. It should be further understood that terms in common usage should also be interpreted as is customary in the relevant art and not in an idealized or overly formal sense unless expressly so defined herein.

<Embodiment>

Figure 2:
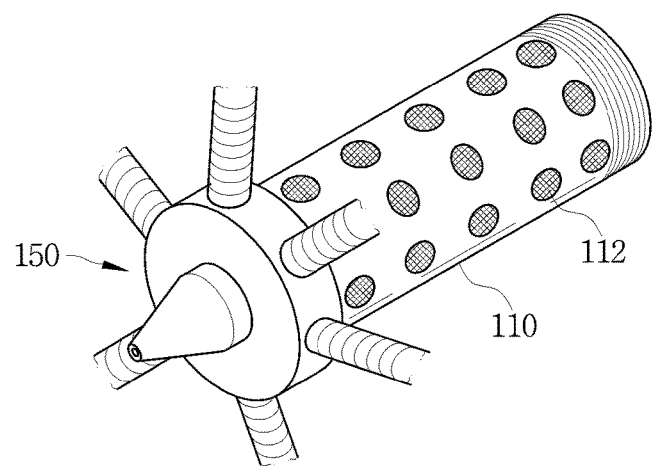
FIG. 2 is a perspective view illustrating an injection module in the injection molding apparatus according to the embodiment of the present invention.
Figure 3:
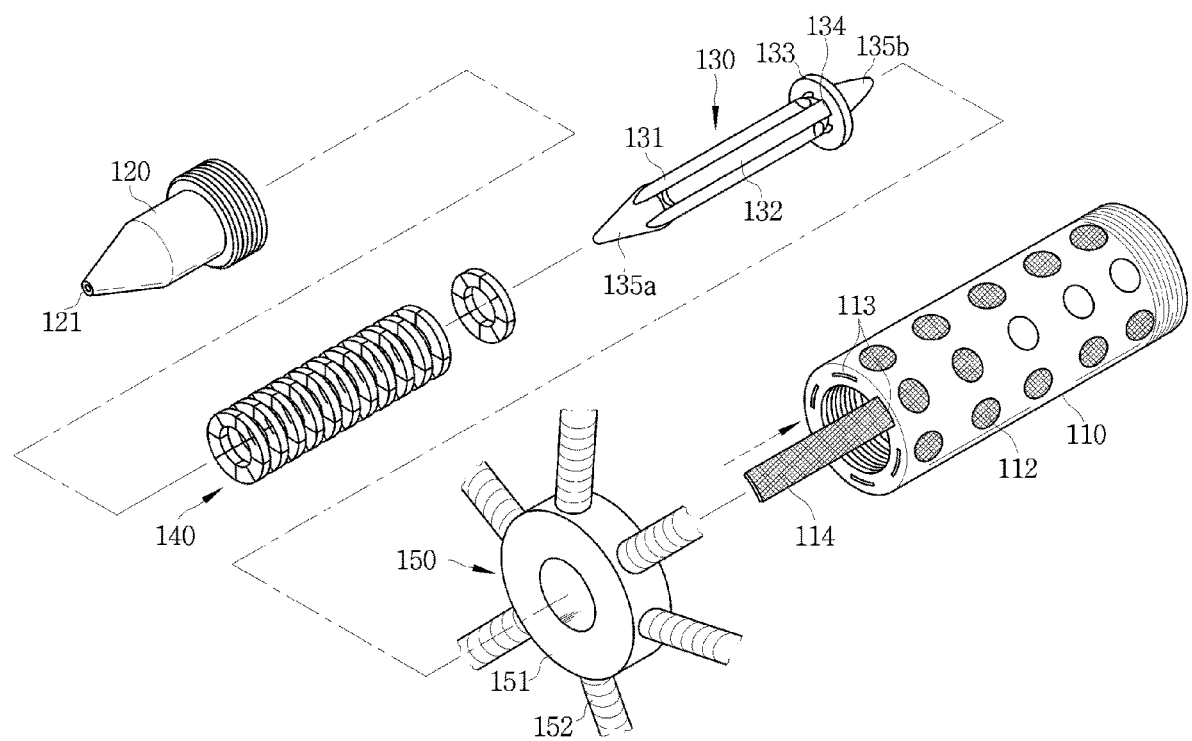
FIG. 3 is an exploded perspective view for describing a structure of the injection module in the injection molding apparatus according to the embodiment of the present invention.
Figure 4:
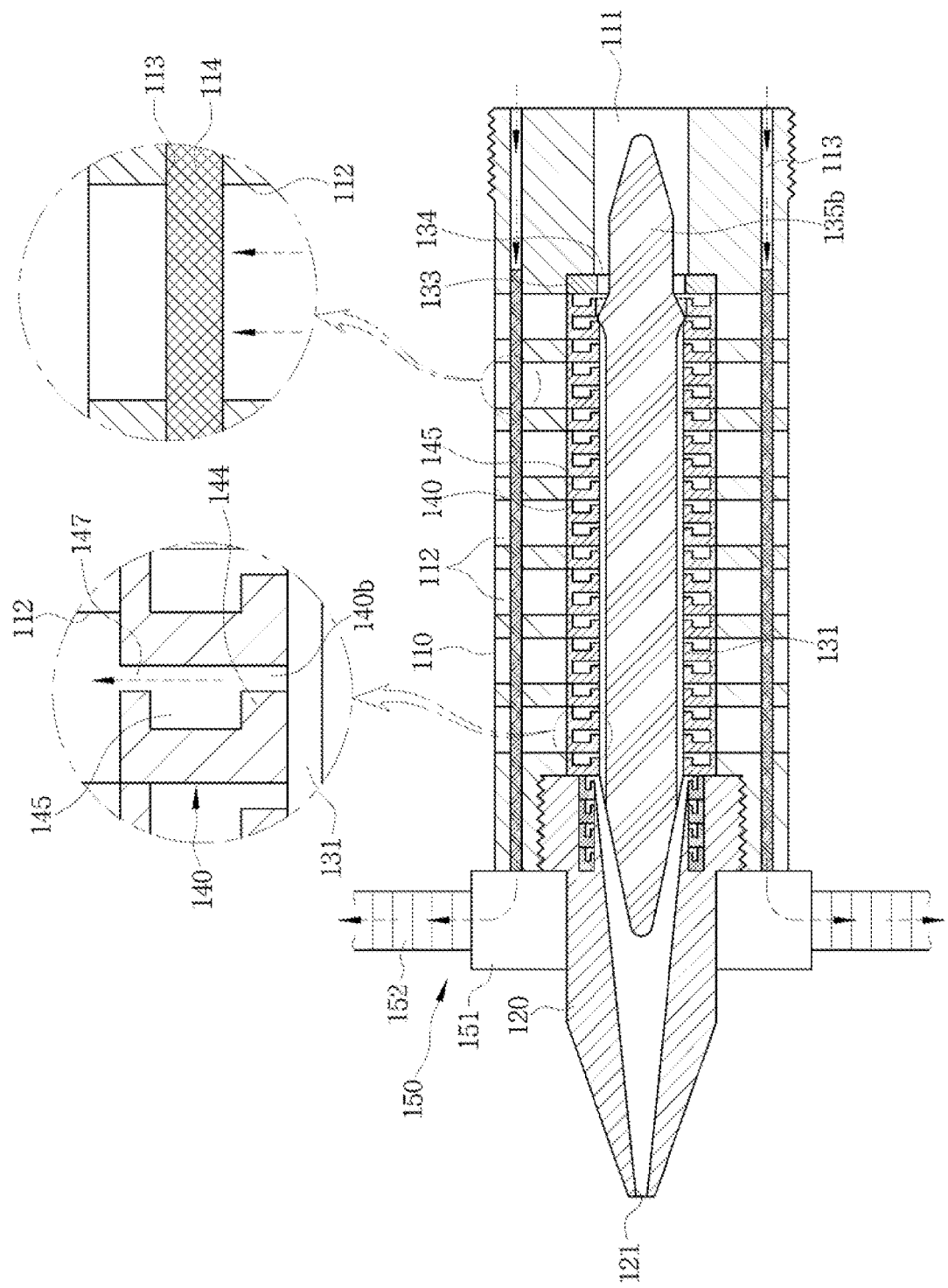
FIG. 4 is a cross-sectional view for describing the structure and operation of the injection module in the injection molding apparatus according to the embodiment of the present invention.
Figure 5:
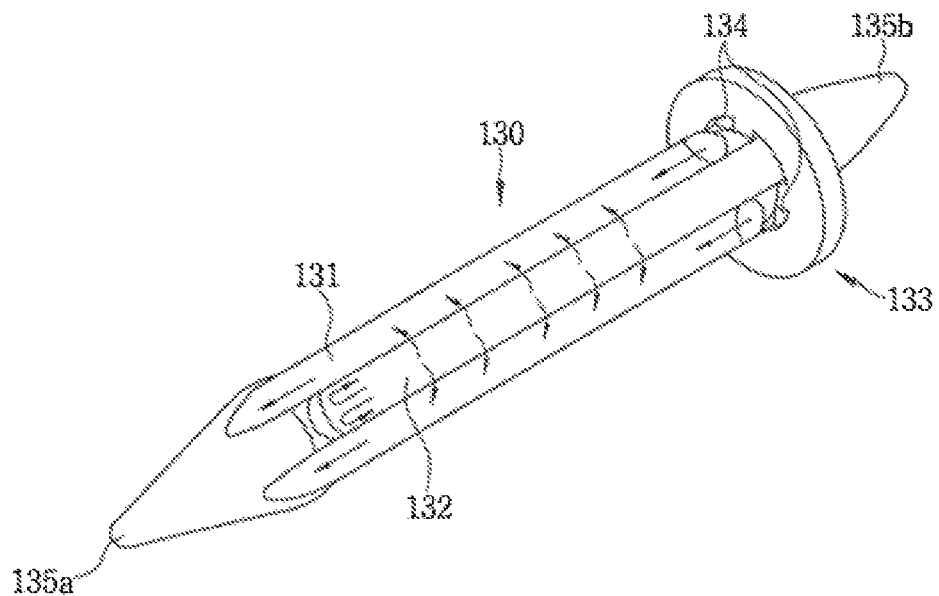
FIG. 5 is a perspective view illustrating a guide member of the injection module in the injection molding apparatus according to the embodiment of the present invention.
Figure 6:
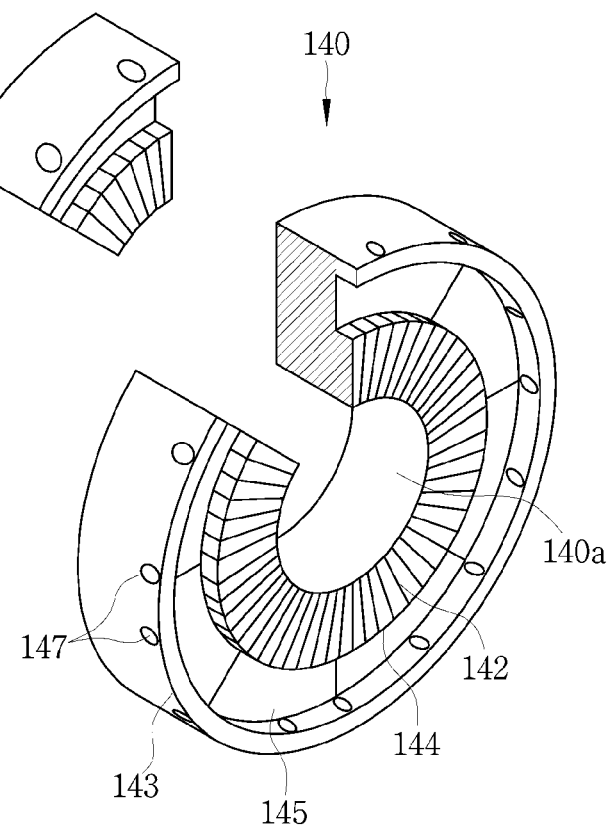
FIG. 6 is a perspective view illustrating a discharge member of the injection module in the injection molding apparatus according to the embodiment of the present invention.
Figure 7:
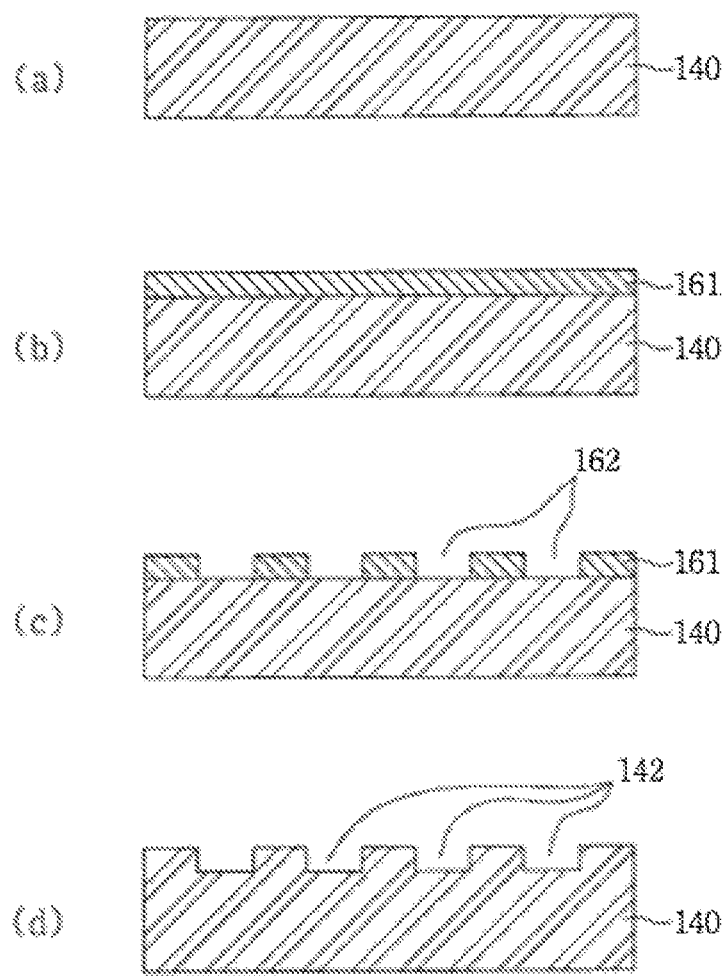
FIG. 7 is a reference view for describing detailed processes for describing an etching method of forming slits formed in the discharge member of the injection module in the injection molding apparatus according to the embodiment of the present invention.

FIG. 1 is a block diagram illustrating an injection molding apparatus according to an embodiment of the present invention, FIG. 2 is a perspective view illustrating an injection module in the injection molding apparatus according to the embodiment of the present invention, FIG. 3 is an exploded perspective view for describing a structure of the injection module in the injection molding apparatus according to the embodiment of the present invention, FIG. 4 is a cross-sectional view for describing the structure and operation of the injection module in the injection molding apparatus according to the embodiment of the present invention, FIG. 5 is a perspective view illustrating a guide member of the injection module in the injection molding apparatus according to the embodiment of the present invention, and FIG. 6 is a perspective view illustrating a discharge member of the injection module in the injection molding apparatus according to the embodiment of the present invention;

As illustrated in the drawings, an injection molding apparatus 10 according to the embodiment of the present invention includes a supply unit 100, a heating unit 200, an injection unit 300, a print unit 500, and a mold unit 400 and manufactures an injection molded product having patterns, colors, and textures which are high quality and are very similar to those of a real material by a method of molding the injection molded product in the mold unit 400 after completely removing a gas included in a melted resin using the injection module installed in the injection unit 300 and transferring a surface layer of a film to the injection molded product.

The supply unit 100 is a unit configured to supply a raw material into a cylinder of the heating unit 200 and includes a hopper configured to supply the raw material, a feed screw configured to feed the raw material supplied from the hopper, and a motor configured to provide power to the feed screw. In this case, a raw material detecting sensor capable of checking and controlling supplying of the raw material may be installed to supply a predetermined quantity of the raw material to the feed screw.

The raw material supplied to the supply unit 100 may be a thermoplastic resin material and may include thermoplastic resins such as polyethylene, polypropylene, polyester, polystyrene, and liquid crystalline polymer. The thermoplastic resins have superior formability and physical engineering values so that the thermoplastic resins are widely used to manufacture mechanical products. In addition, in order to improve the mechanical strength of the injection molded product, a filler such as an inorganic fiber may be further included in the raw material including the thermoplastic resin, and the raw material may also be provided with a mixture in which the thermoplastic resin and a compound are mixed. As described above, the raw material supplied to the supply unit 100 is fed to the heating unit 200.

The heating unit 200 includes a heating cylinder and heats the raw material supplied from the supply unit 100 through a raw material supply pipe. A raw material input port connected to the raw material supply pipe is formed in an outer circumferential surface of the heating cylinder, and a screw is installed in the heating cylinder. A heater configured to melt the raw material to form a melted resin is embedded in the heating cylinder, and the heater may include a coil which melts a resin using Joule heating. The melted resin formed by melting the resin in the heating cylinder is supplied to the injection unit when the screw rotates in the heating cylinder.

Before the injection unit 300 receives the melted resin and injects the melted resin into the mold unit 400, a gas included in the melted resin is discharged. To this end, the injection module having the above-described specific structure is installed in the injection unit 300. Hereinafter, the injection module will be described in detail with reference to FIGS. 2 to 10.

The injection module includes a main body 110, a spray head 120, a guide member 130, discharge members 140, and a suction member 150. Particularly, the main body 110, the guide member 130, the discharge members 140, and the suction member 150 cooperate to completely remove a gas from a melted resin, and then, a high quality final product may be obtained when an injection molded product is formed by molding the melted resin and transferring a surface layer of a film to the injection molded product.

The main body 110 is a member having a hollow inner space and a cylindrical shape. A rear end portion of the main body 110 is connected to an injector cylinder and receives a melted resin, and a front end portion thereof is coupled to the spray head 120. The hollow inner space of the main body 110 becomes a path 111 of the melted resin. Accordingly, the melted resin supplied through the rear end portion of the main body 110 reaches the spray head 120 installed at a front end portion of the main body 110 through the path 111 and is sprayed.

A plurality of gas discharge holes 112 are formed in a wall of the main body 110 so that the gas evaporated from the melted resin passing through the inner space is discharged to the outside. In addition, eject holes 113 which completely pass through the wall of the main body 110 in a longitudinal direction and intersect the gas discharge holes 112 are further formed in the wall. The eject holes 113 generate a high speed air flow due to a vacuum suction force of a vacuum pump using a suction member to accelerate evaporation and discharge of the gas from the melted resin. When the high speed air flow is generated through the eject holes 113 formed to completely pass through an interior of the wall of the main body 110 in the longitudinal direction as described above, the high speed air flow acts as a strong force to suction the gas from the melted resin flowing in the inner space of the main body 110 so as to accelerate the evaporation and the discharge of the gas from the melted resin. Accordingly, the gas can be more completely removed from the melted resin. A specific structure in relation thereto will be described with reference to FIG. 4.

Meanwhile, porous wire bars 114 manufactured by weaving fine wires are inserted into the eject holes 113. The porous wire bars 114 cause the vacuum suction force generated by the suction member 150 to uniformly act in the inner space of the main body 110 so as to cause the evaporation to occur uniformly from all of the melted resin flowing along the guide member 130. When there are no members like the porous wire bars 114 which uniformly disperse the vacuum suction force, a gas may be unequally evaporated from only one portion of the melted resin due to a high speed air flow generated in the eject holes 113, bubbles may be generated, and thus it may be difficult to mold a high quality injection molded product and transfer a surface layer of a film to the injection molded product.

The suction member 150 includes a hub box 151 formed to have a ring shape along the front end portion of the main body 110 and to communicate with the eject holes 113 of the main body 110 and a plurality of suction hoses 152 radially connected to the hub box 151 to suction air of the eject holes 113 at a high speed using a vacuum suction force of the vacuum pump. In this case, although not illustrated in the drawings, an interior of the hub box 151 may be divided into a plurality of inner chambers corresponding to the eject holes 113, and the vacuum suction force of the vacuum pump may be provided to the inner chambers through the suction hoses 152. Accordingly, the uniform vacuum suction force is applied to the entire interior of the main body 110.

A rear end portion of the spray head 120 is coupled to the front end portion of the main body 110, and a nozzle 121 is formed at a front end portion of the spray head 120 and sprays the melted resin flowing along the guide member 130 from the inner space of the main body 110 toward the mold unit 400. In this case, the main body 110 may be screw-coupled to the spray head 120 as illustrated in the drawing or may also be press-fitted to the spray head 120.

As illustrated in FIG. 5, cones 135*a* and 135*b* may be formed at both end portions of the guide member 130, and first guide grooves 131 and second guide grooves 132 are formed in an outer circumferential surface of the guide member 130 to be parallel to each other in the longitudinal direction so as to guide the melted resin to flow. In this case, front end portions of the first guide grooves 131 are open to allow the melted resin to flow to the spray head 120, but front end portions of the second guide grooves 132 are closed to cause the melted resin flowing along the second guide grooves 132 to overflow and to be introduced into the first guide grooves 131 so as to induce the gas included in the melted resin to be evaporated. A support unit 133, which blocks the discharge members 140 from leaving from the main body 110 and supports the discharge members 140 such that portions of the discharge members 140 corresponding to positions at which the first guide grooves 131 and the second guide grooves 132 are formed are positioned at a central portion of the main body 110, is integrally formed at a rear end portion of the guide member 130. Connecting holes 134 are formed at positions of the support unit 133 which correspond to the second guide grooves 132. The connecting holes 134 serve to connect the melted resin path 111 and the second guide grooves 132. According to the structure of the connecting holes 134, the melted resin supplied to the melted resin path 111 is movable toward the spray head 120 through the second guide grooves 132. Then, movement of the melted resin is restricted by the closed front end portions of the second guide grooves 132, and the melted resin overflows to the first guide grooves 131. Through this process, the melted resin uniformly and thinly spreads and the gas included in the melted resin is evaporated. Then, the melted resin moves to the spray head 120 along the first guide grooves 131 and is sprayed onto the mold unit 400 through the nozzle 121.

As illustrated in FIG. 6, the plurality of discharge members 140 are formed to have flat ring shapes having hollow central portions to wrap an outer side of a section of the guide member 130 in which the first guide grooves 131 and the second guide grooves 132 are formed, are disposed to be adjacent to each other, and serve to discharge the gas evaporated from the melted resin. To this end, a first protrusion 143 and a second protrusion 144 are provided at an inner side and an outer side of one surface of each of the discharge members 140 in a circumferential direction, and a gas chamber 145 is formed between the first protrusion 143 and the second protrusion 144.

A plurality of slits 142 for discharge are radially formed in the second protrusion 144 of the discharge member 140. Accordingly, the gas included in the melted resin is moved and collected in the gas chamber 145 through the slits 142. In this case, as illustrated in FIG. 6, the discharge member 140 may be provided with a plurality of radially divided pieces so that fine gaps may be formed between the divided pieces, and thus, the gas evaporated from the melted resin may be discharged through the fine gaps. According to the drawing, the discharge member 140 may be divided into eight pieces, but the number of pieces is controllable. In addition, a plurality of discharge holes 147 are formed in the first protrusion 143 of the discharge member 140 to discharge the gas. In addition, the second protrusion 144 protrudes to be lower than the first protrusion 143 so as to allow the gas to flow when the discharge members 140 are in contact with each other. Accordingly, the gas evaporated from the melted resin moving along the guide member 130 may be more smoothly introduced into the gas chamber 145 formed in the discharge member 140.

The slits 142 of the discharge member 140 are formed to have a depth of an extent to which a gas component is easily separated from the melted resin and the melted resin is also not easily leaked. The depth ranging from 0.001 to 0.02 mm is suitable. However, forming the slits 142 in the discharge member 140 needs very precise machining, and the slits 142 may be formed through an etching method. The formation of the slits 142 will be described with reference to FIGS. 7 and 8.

To this end, the discharge member 140 in an unfinished state in which slits are not formed is prepared as illustrated in FIG. 7A.

Then, as illustrated in FIG. 7B, a resist layer 161 is formed on the discharge member 140. In this case, various kinds of generally used resists such as a photoresist or a thermosetting resist may be applied to a material forming the resist layer 161, and the resist layer 161 may be formed as a film type layer or may be formed through a spray coating method, or the like.

Then, as illustrated in FIG. 7C, a micro pattern 162 is formed in the resist layer 161. Various methods such as a photolithography method, an imprint lithography method, a flexible etching method, and an injection molding method may be applied to a method of forming the micro pattern.

Then, as illustrated in FIG. 7D, after portions of a surface of the discharge member 140 are corroded through an etching method, the resist layer 161 remaining on the surface of the discharge member 140 is removed. In this case, a dry etching method, a wet etching method, or the like may be applied to the etching method. That is, the discharge member 140 may be exposed to a solution to be corroded or may be exposed to a plasma to form the slits 142.

Figure 8:
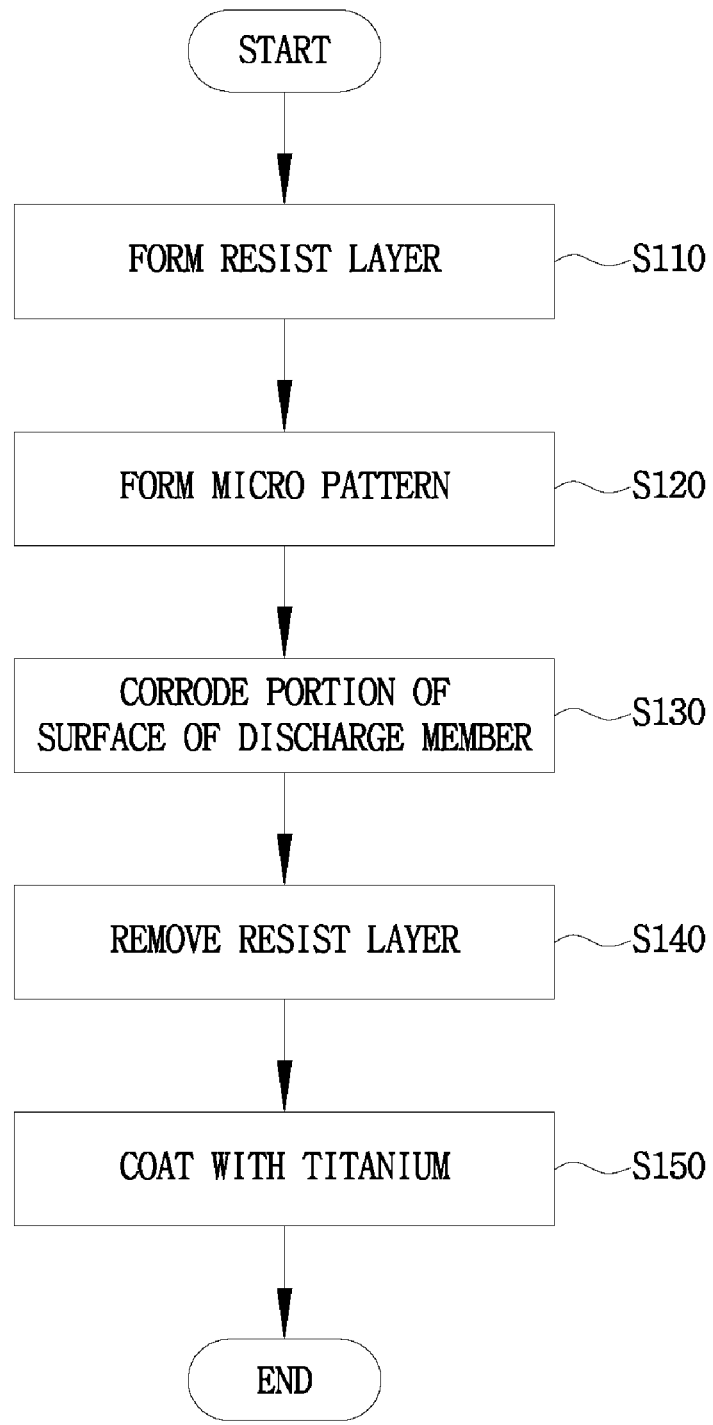
FIG. 8 is a flowchart for describing the etching method of forming the slits formed in the discharge member of the injection module in the injection molding apparatus according to the embodiment of the present invention.

As described above, the method of forming the slits in the discharge member 140 through the etching method may be summarized as forming the resist layer on the discharge member 140 (S110), forming the micro pattern in the resist layer (S120), corroding the portions of the surface of the discharge member 140 (S130), and removing the resist layer (S140) as shown in FIG. 8. However, coating with titanium (S150) may be added to the method to prevent corrosion and prevent expansion of the slits 142.

Figure 9:
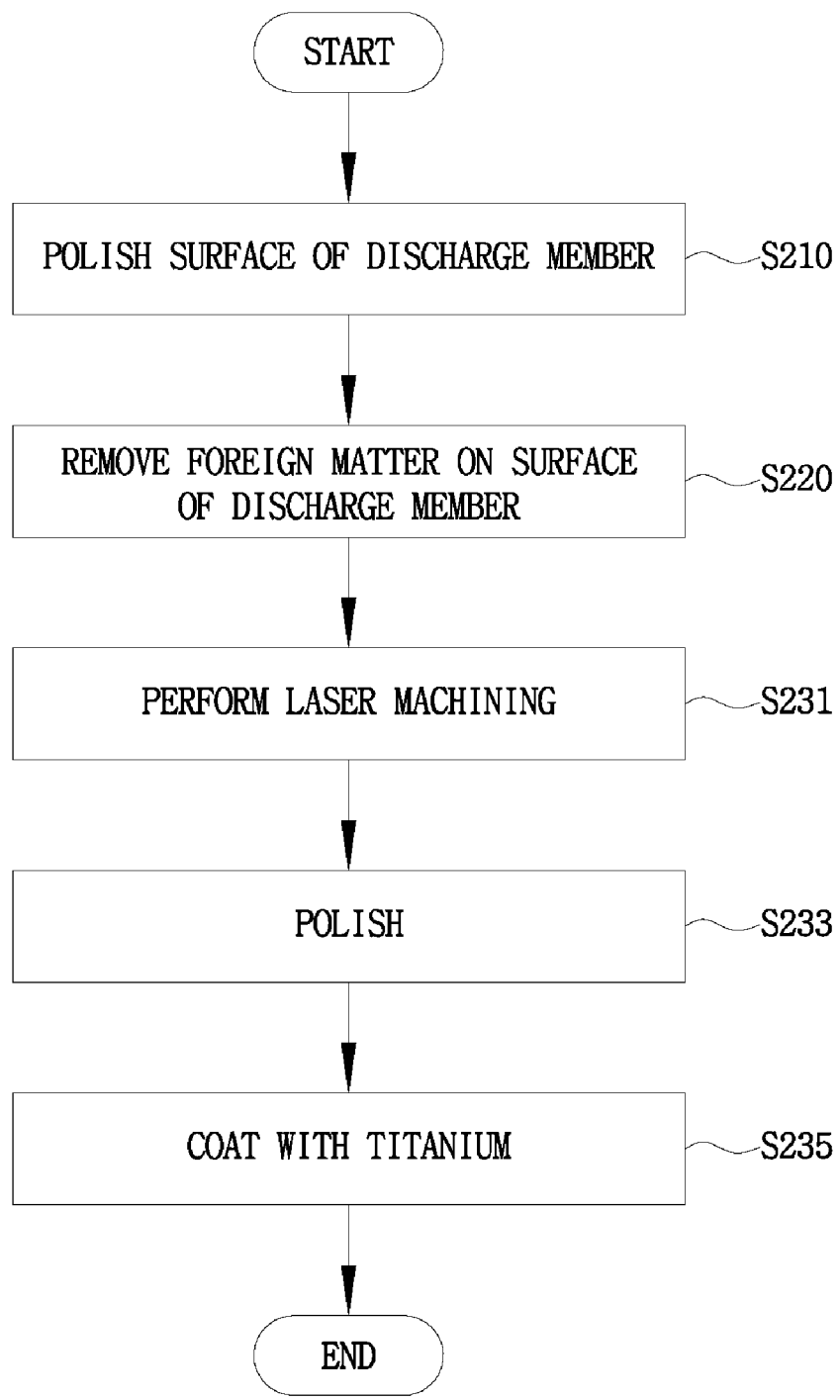
FIGS. 9 and 10 are flowcharts for describing laser machining methods of forming the slits formed in the discharge member of the injection module in the injection molding apparatus according to the embodiment of the present invention.

Meanwhile, the slits 142 of the discharge member 140 may also be formed by a light amplification by stimulated emission of radiation (laser) machining, in this case, the slits 142 may be formed through polishing a surface of the discharge member 140 (S210), removing foreign matter on the surface of the discharge member 140 (S220), forming the slits 142 by laser machining the surface of the discharge member 140 (S231), polishing (S233), and coating the surface of the discharge member 140 with titanium as illustrated in FIG. 9. In this case, the removing of the foreign matter on the surface of the discharge member 140 (S220) may also be performed in the middles between the operations to improve precision of the slits 142 of the discharge member 140, and the polishing (S233) may also be performed in a middle of a manufacturing process.

Figure 10:
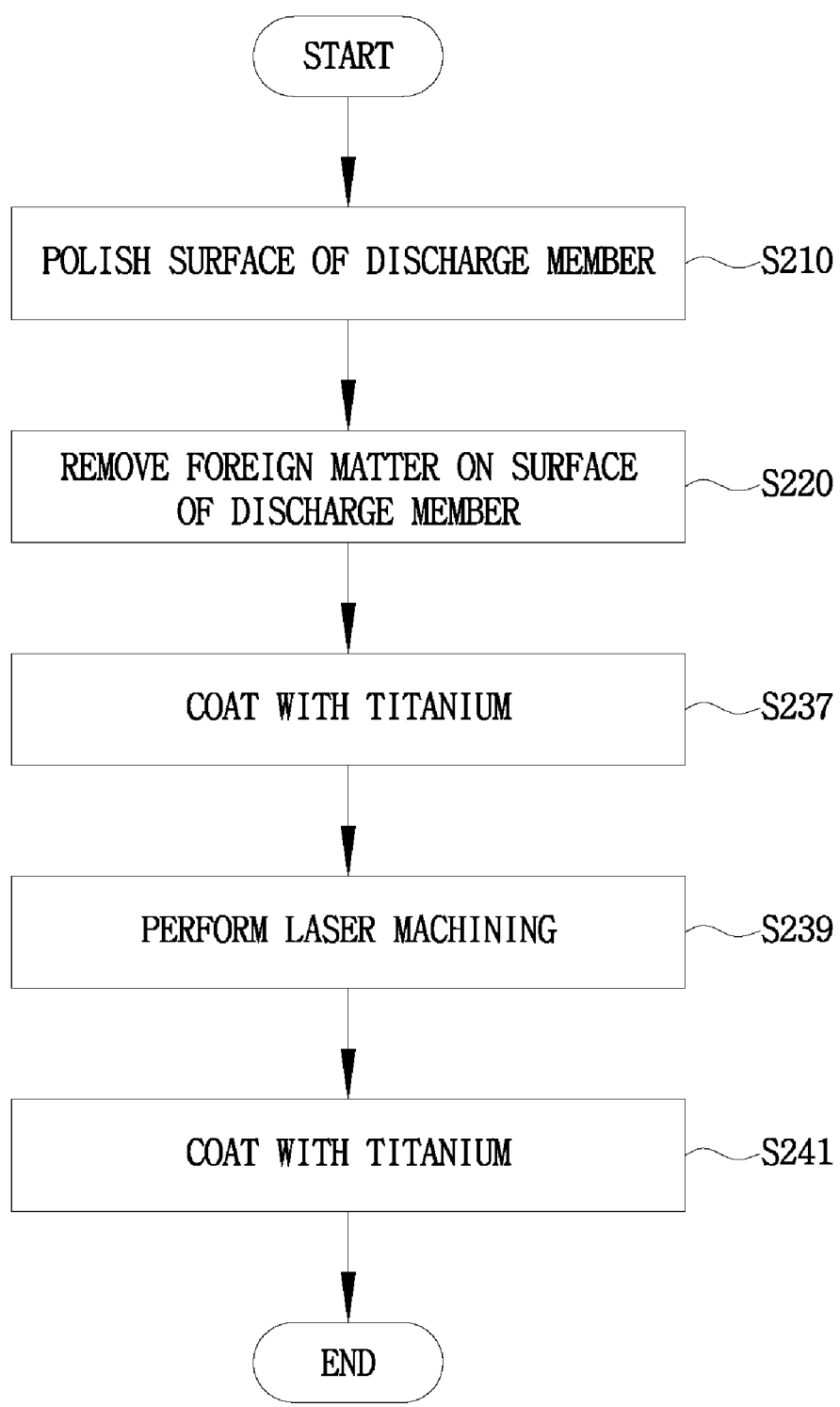

Alternately, as illustrated in FIG. 10, coating with titanium (S237) may be performed before and after laser machining (S239) to improve surface precision and prevent corrosion after the machining. Similarly, the coating with titanium (S237) may also be performed in the middles between operations to improve precision of the slits 142 of the discharge member 140 in removing foreign matter on a surface of the discharge member 140 (S220). Polishing (S233) may also be performed in a middle of a manufacturing process.

In addition, an injection molding method according to an embodiment of the present invention will be described.

An injection molding method according to an embodiment of the present invention may include manufacturing, by the print unit, a molding film provided with a surface layer including a film layer, a pattern layer, a release layer, and a ultra-violet curable resin, a print layer, and an adhesive layer (1), discharging, by the injection unit, a gas from a melted resin and injecting the melted resin into the mold unit (2), inputting the manufactured molding film and an injection molded product, which is primarily molded from the melted resin from which the gas is removed, into the mold unit and transferring the surface layer of the film to the injection molded product (3), and obtaining the injection molded product by removing an unnecessary portion of the film from the injection molded product (4). In addition, according to selection of a user, the injection molding method may include secondarily curing the surface layer by emitting ultra-violet light to the injection molded product.

As described above, in the injection molding method, the mold unit performs the process in which the film is pressed against the injection molded product that the injection molding is completed primarily to transfer the surface layer, the mold unit inputs the melted resin from which the gas is removed to one surface of the film (3), and this method has higher reliability than a method of simultaneously performing injection molding and transferring a surface layer, and thus, has an advantage of obtaining a higher quality injection molded product. A detailed process thereof will be described with reference to FIGS. 11 to 18.

Figure 11:
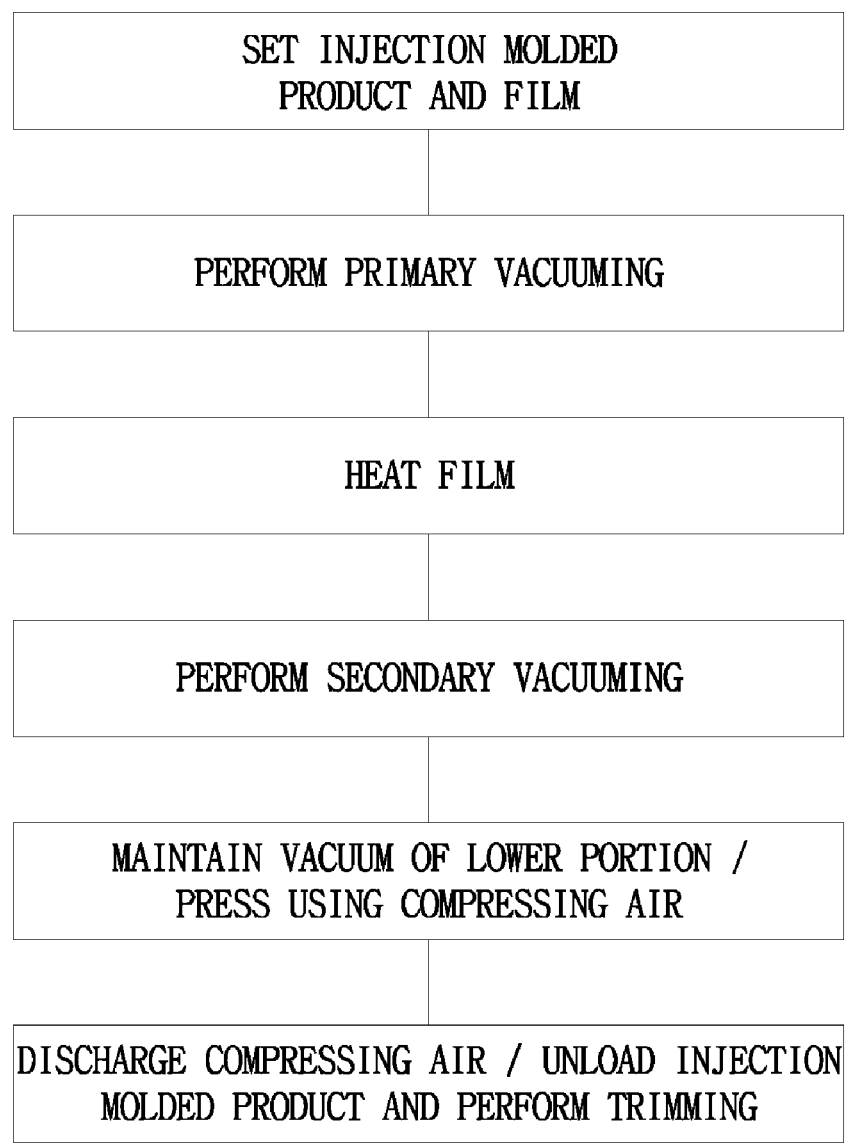
FIG. 11 is a flowchart for describing a detailed process of a surface layer transfer method in an injection molding method according to the embodiment of the present invention.

FIG. 11 is a flowchart for describing a detailed process of a surface layer transfer method in the injection molding method according to the embodiment of the present invention.

In the embodiment of the present invention, as illustrated in FIG. 11, the surface layer transfer method may mainly divided into setting the injection molded product and the film, primary vacuum processing, heating the film, secondary vacuum processing, maintaining vacuum of a lower portion/pressing using compressing air and trimming after discharging the compressing air/unloading the injection molded product.

Figure 12:
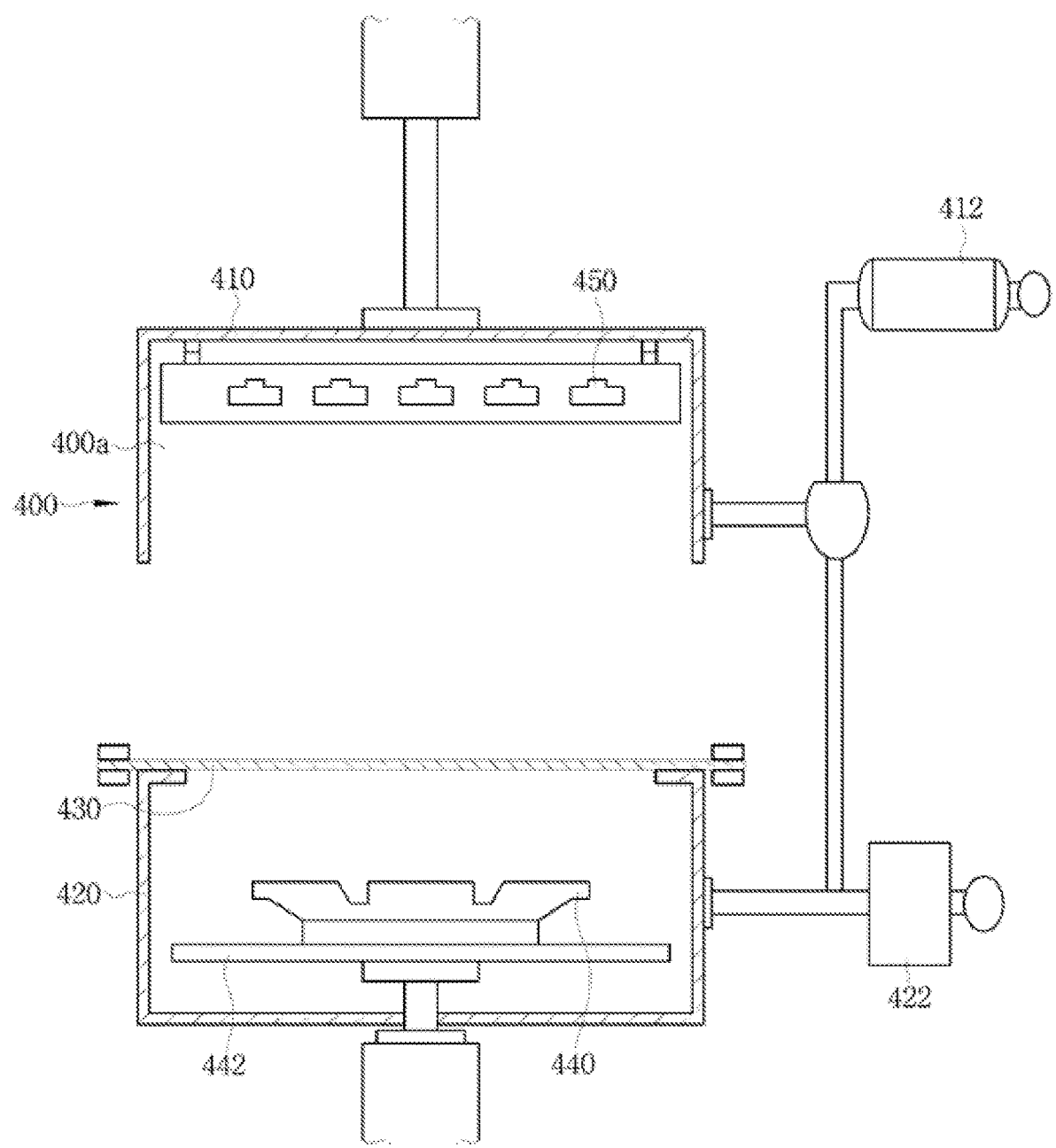
FIGS. 12 to 17 are a series of reference views for describing the detailed process of the surface layer transfer method of the in the injection molding method according to the embodiment of the present invention.

In the setting of the injection molded product and the film, as illustrated in FIG. 12, an injection molded product 440 is positioned on a support plate 442 in the mold unit 400 divided into an upper mold 410 and a lower mold 420, and the film 430 is positioned on the lower mold 420.

Figure 13:
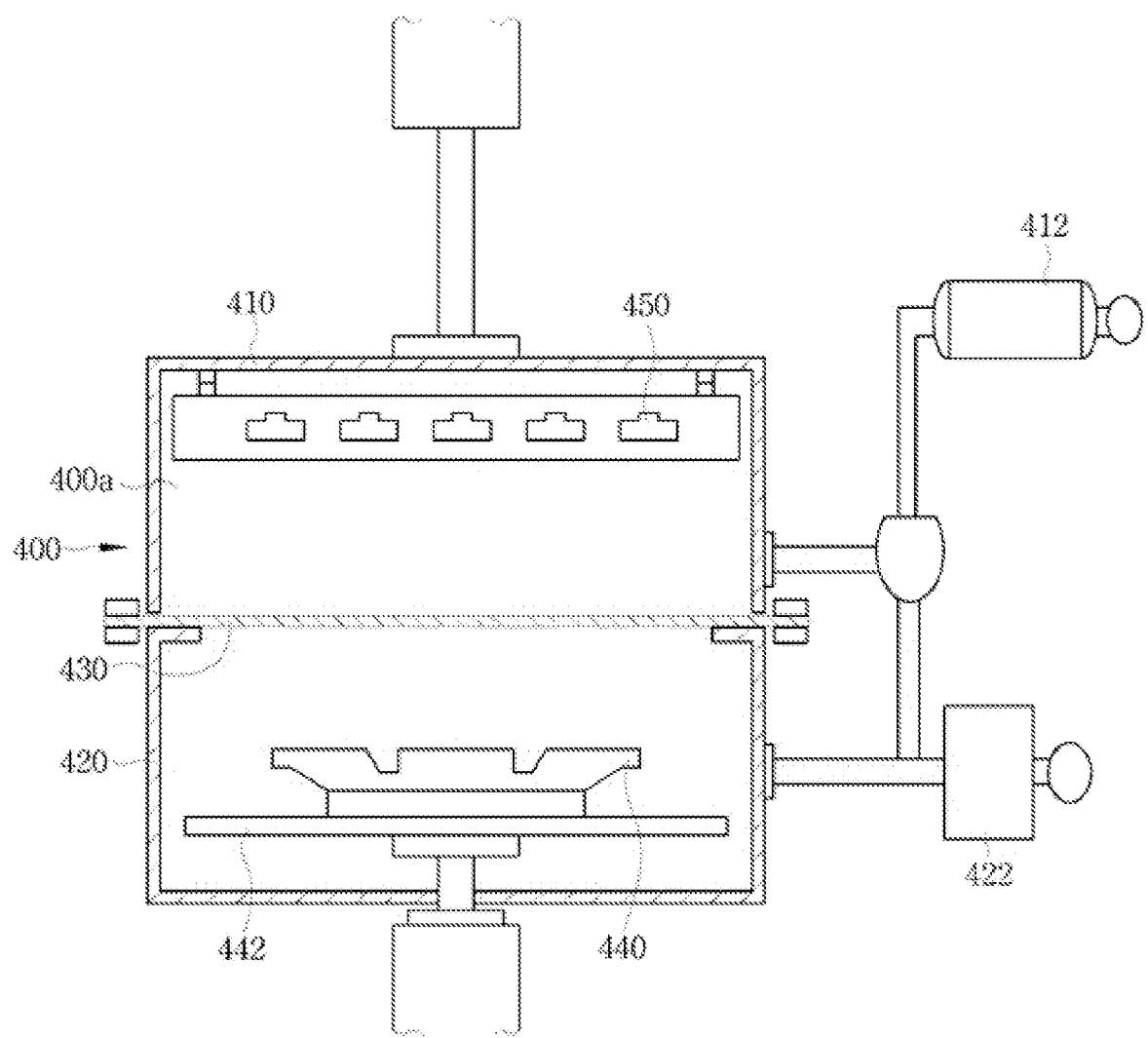

In the primary vacuum processing, as illustrated in FIG. 13, after the mold unit 400 in which the injection molded product 440 and the film 430 are positioned is sealed, air in a mold chamber 400a of the mold unit 400 is suctioned using a vacuum apparatus 422 so that the mold unit interior enters a vacuum state.

Figure 14:
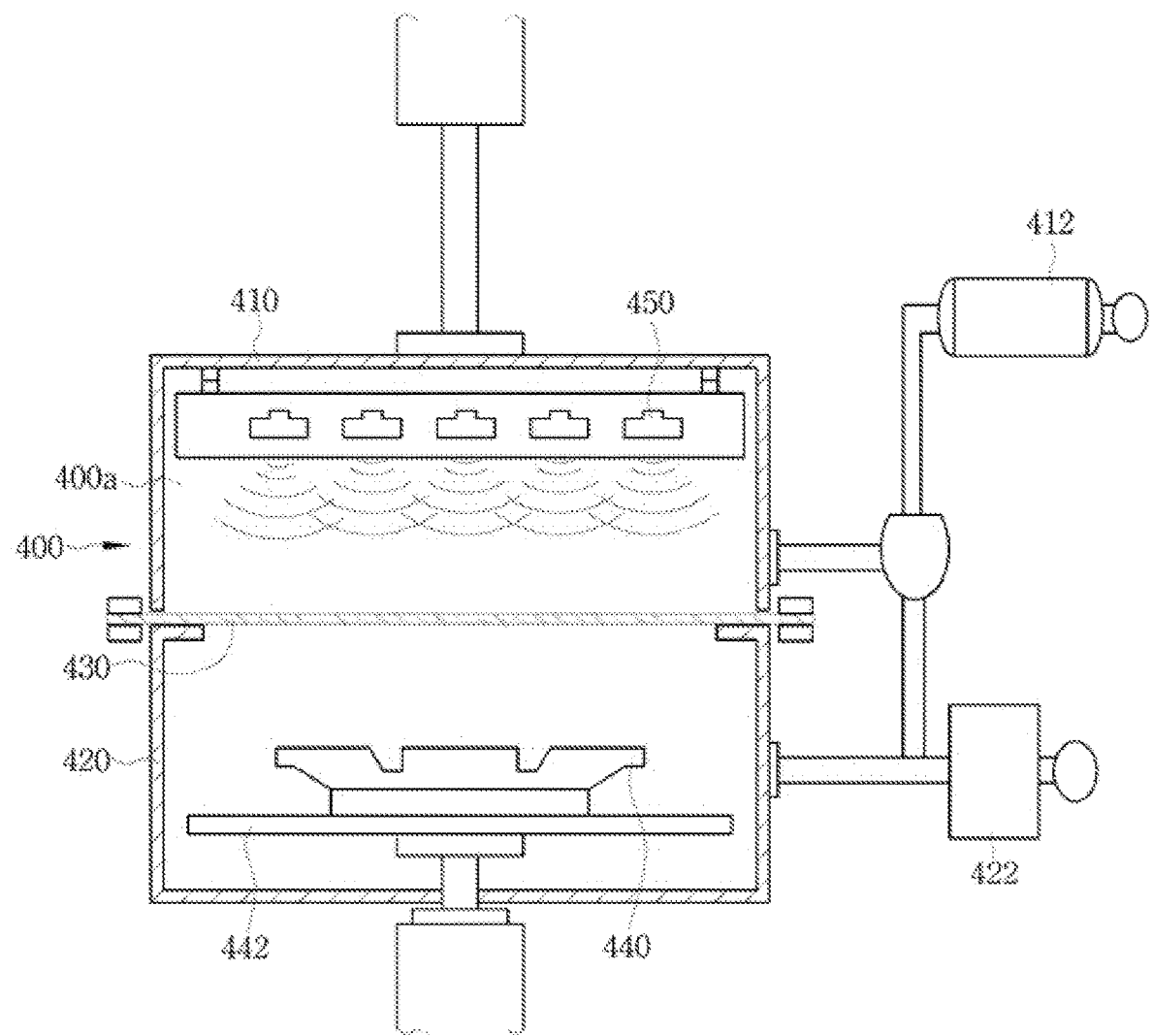

In the heating of the film, as illustrated in FIG. 14, after the mold chamber 400a of the mold unit 400 enters the vacuum state, the film 430 is heated using heating units 450.

Figure 15:
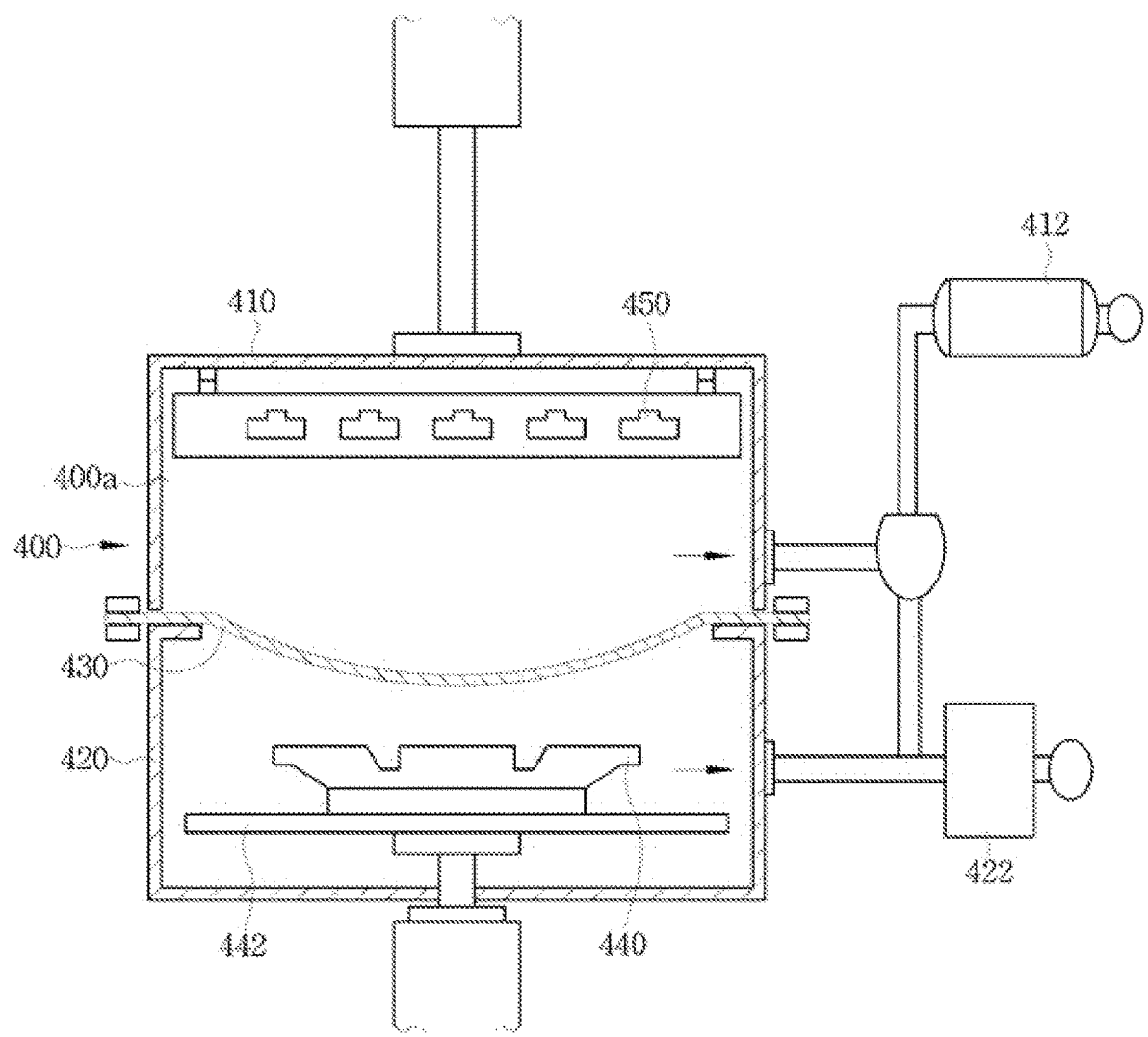

In the secondary vacuum process, as illustrated in FIG. 15, after the film 430 is heated, air in the mold chamber 400a of the mold unit 400 is further suctioned using the vacuum apparatus 422 so that the mold chamber 400a enters a secondary vacuum state.

Figure 16:
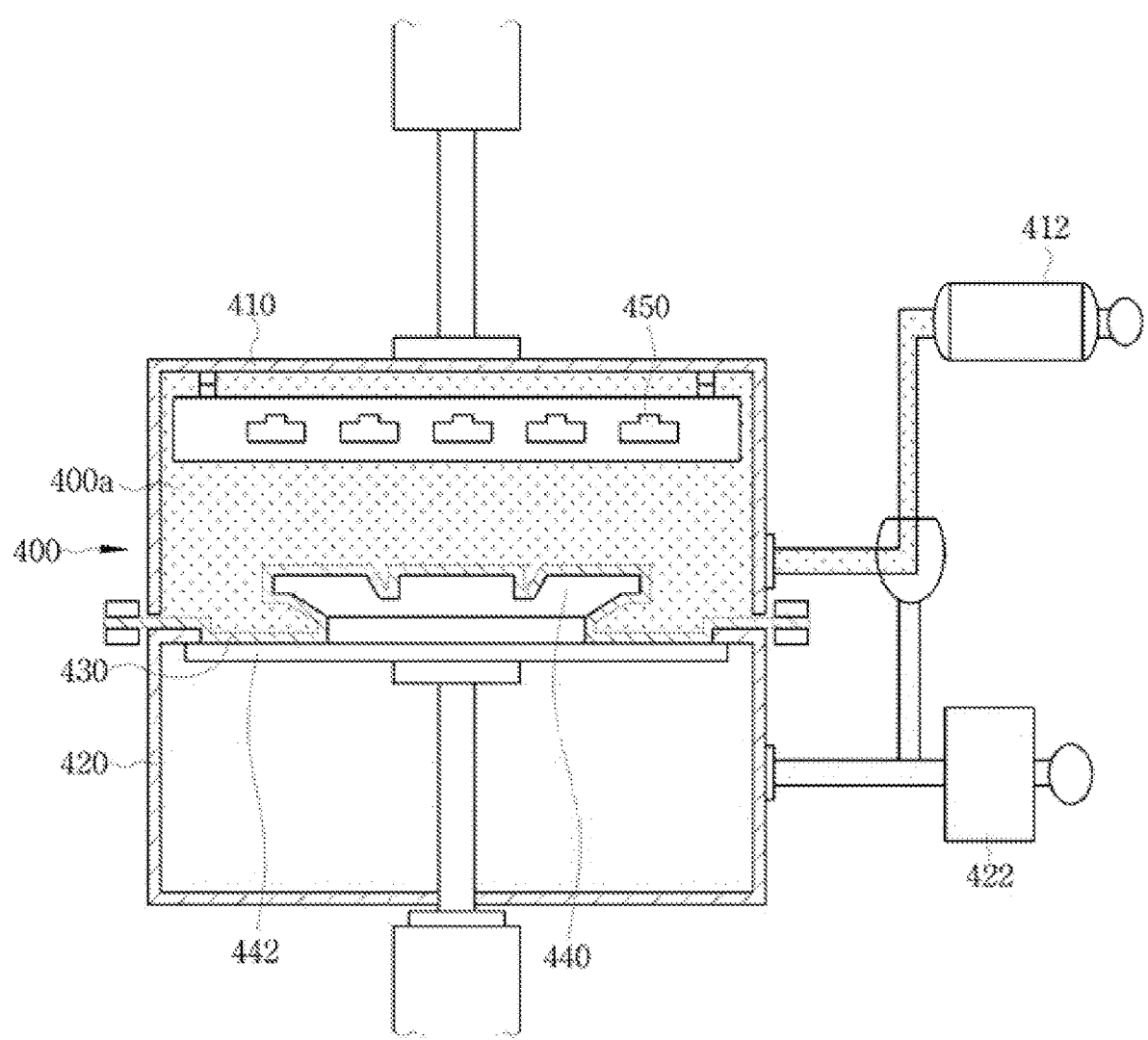

In the maintaining of the vacuum of the lower portion/the pressing using the compressing air, as illustrated in FIG. 16, the support plate 442 is moved upward to isolate an upper portion from a lower portion in the mold chamber 400a of the mold unit 400 and maintains a vacuum state of the lower portion of the mold unit interior. In addition, the heated film 430 is attached to the injection molded product 440 while the support plate 442 is moved upward, and compressing air is generated in the upper portion of the mold chamber 400a in the mold unit 400 using a compressing unit 412 to press the film 430 against the injection molded product 440. Accordingly, the film is attached to the injection molded product 440.

Figure 17:
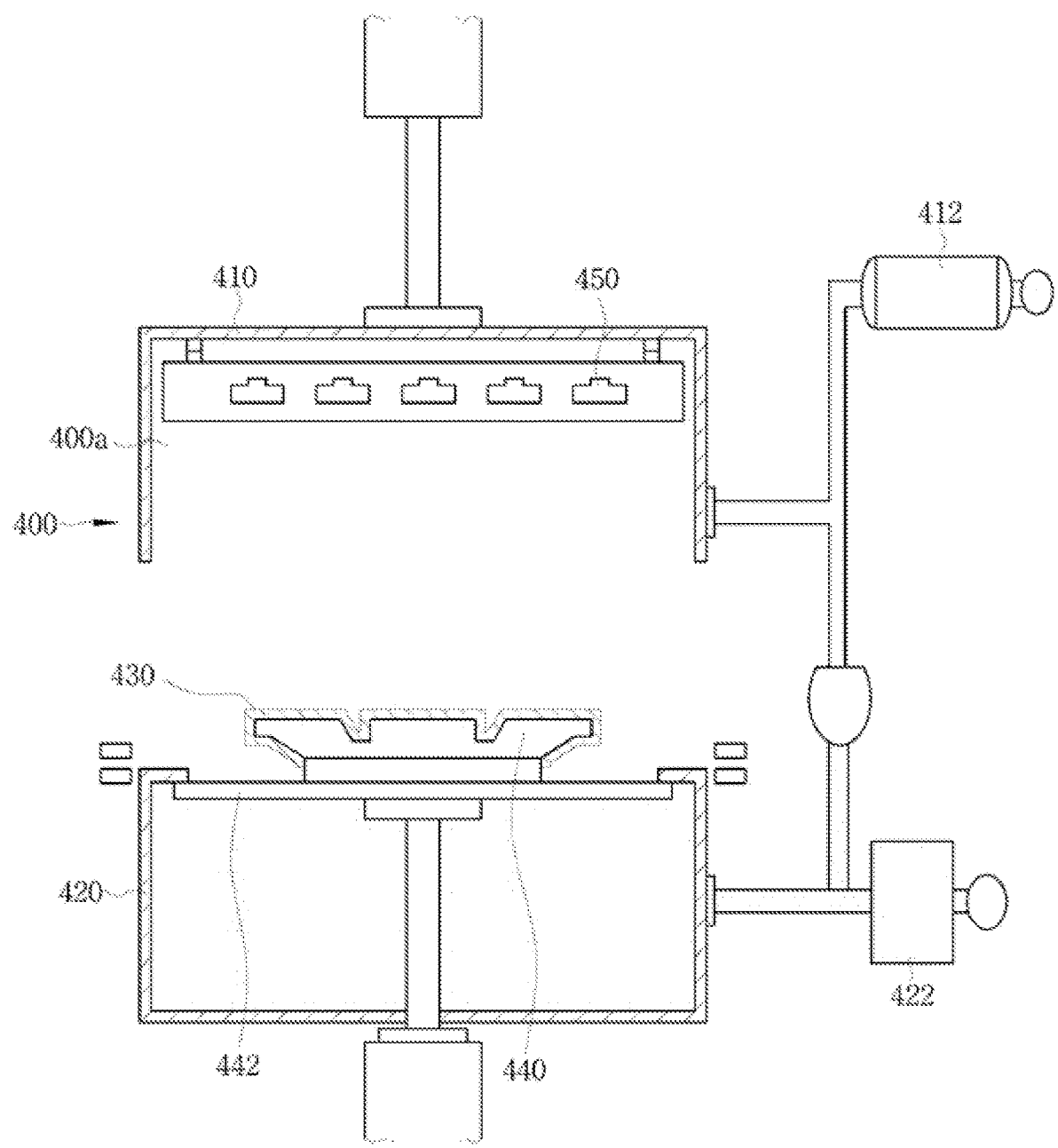

In the trimming after discharging the compressing air and the unloading the injection molded product, as illustrated in FIG. 17, the sealed mold chamber 400a in the mold unit is opened to discharge the compressing air to the atmosphere, and necessary portions of the film attached to the support plate 442 and the injection molded product 440 are removed to obtain the injection molded product which may be a final product.

In addition, a method of manufacturing the molding film by forming a pattern on the film layer will be described below.

The film layer is a base layer for forming a pattern and may include at least one kind of film selected from the group consisting of polyethylene terephthalate (PET), polycarbonate (PC), polyvinyl alcohol (PVA), nylon, and a mixture thereof. The thickness of the film layer may range from 12 to 188 μm.

The pattern layer is a layer for forming a pattern so as to decorate the surface layer which becomes a surface of the final product and is formed on a rear surface of the film layer. The pattern for decorating the surface layer may have various designs such as a wood grain, a stone pattern, a hair line, a hologram, and a mat, and gloss of the pattern may be controlled. The pattern layer may be formed by patterning a composite for forming the pattern layer into a desired design through a printing method such as a silkscreen printing method or a (micro) gravure printing method, a coating method such as a micro gravure coating method, a roll coating method, or a comma coating method, or a machining method such as a roll brush machining method or a press machining method.

The material for forming the pattern layer may include at least one solution selected from the group consisting of an acrylic polyol resin, an isocyanate hardener and toluene, methylethylketone (MEK), and ethylcelusolve, and may further include additives such as silica or nitrocellulose. In this case, amounts of the components may be adjusted and used according to a method of forming the pattern layer and the thickness of the pattern layer.

The release layer is a layer for separating the film layer and the pattern layer from the surface layer, which becomes the surface of the final product after the injection molding is completed, and is formed on a rear surface of the pattern layer. The release layer may be formed using a cured silicone product, but a material which has high chemical resistance and is not repainted may be used for the release layer, and a film which is separated from the pattern layer or the film layer may also be used as the release layer. Specifically, the release layer may be formed using a releasable material such as various silicones, wax, cellulose acetate, or nitrocellulose, or a composite for forming the release layer including at least one kind of resin selected from the group consisting of an acrylic modified silicone resin, a melamine resin, and an alkyd resin.

The rear surface of the pattern layer may be coated with the composite for forming the release layer using a micro gravure coating method, a roll coating method, a dip coating method, a spray coating method, or the like and may be dried for a proper time period to form the release layer at a temperature ranging from 130 to 220° C. and preferably a temperature ranging from 150 to 200° C.

The surface layer is a layer forming the surface of the injection molded product which is the final product, and is formed on a rear surface of the release layer, and the thickness of the surface layer may range from 2 to 30 μm.

The print layer is a layer for realizing colors and a picture and is formed on a rear surface of the surface layer. The print layer may be formed using any general ink or coating agent which is naturally dryable, ultra-violet curable, or thermally curable, and colorings may be used with the general ink or coating agent to realize colors. In a case in which the print layer has a single color, the single and uniform color may be realized through a full printing method or coating method, and in a case in which a picture is printed, a design having a superior resolution may be realized using various printing methods.

In this case, the print layer may be formed using a printing method or coating method which is the same as that of the formation of the pattern layer, or an offset printing method, an inkjet sublimating transfer method, or the like may be used to form the print layer. The print layer may also be formed by depositing particles of aluminum paste, copper paste, pearl, or the like through a sputtering method. In this case, a deposition primer may be formed by only printing ink or additionally coating (printing) with ink, and both of the printing and the deposition may also be used. In addition, the print layer may also be directly formed on the adhesive layer using a resin for forming the adhesive layer. The thickness of the print layer may range from 1 to 100 μm or preferably range from 1 to 30 μm.

The adhesive layer is a layer for improving adhesiveness when the molding film is attached to the injection molded product and is formed on a rear surface of the print layer. The adhesive layer is a hot melt or thermally reactive adhesive having superior thermal adhesiveness and an adhesive property to various materials of the injection molded product or metal plates and may be formed using a polymer resin capable of thermally fusing such as polyacryl, polyester, polyurethane, ethylene vinyl acetate, polycarbonate, polyethylene, polypropylene, polystyrene, acrylonitrile-butadiene-styrene or various rubber adhesives, or an acrylic resin thermal adhesive. Such materials may be easily melted by solvents or heat. A material for forming the adhesive layer may be selected and used according to a kind of material of the injection molded product, for example, in a case in which a material of the injection molded product is polycarbonate, an acrylic resin and a polycarbonate resin may be mixed and used. The rear surface of the print layer may be coated with a material for forming the adhesive layer using a micro gravure coating method, a roll coating method, a dip coating method, a spray coating method, or the like and may be dried to form the adhesive layer.

As described above, a three dimensional (3D) injection molding apparatus and an injection molding method can manufacture an injection molded product having patterns, colors, and textures which are high quality and very similar to those of a real material by injection molding after completely removing a gas included in a melted resin for forming the injection molded product and transferring a surface layer on which various patterns, colors, and textures are expressed in a mold.

In addition, the present invention can use an ejecting effect due to a high speed air flow to accelerate evaporation and discharging of the gas from the melted resin when the gas is removed from the melted resin.

Although the exemplary embodiments and other embodiments have been described, the present invention may be variously changed and modified, and may include equivalents. It is clear that the embodiments may be suitably modified and similarly applied to the present invention. Accordingly, the above-described contents are not to be limited by the scope of the present invention but defined by the following claims.

What is claimed is:
1. An injection molding apparatus comprising:
a supply unit configured to supply a thermoplastic resin;
a heating unit configured to heat the thermoplastic resin supplied from the supply unit to be melted as a melted resin;
an injection unit configured to inject the melted resin melted by the heating unit;
a print unit configured to form a surface layer on a surface of a film; and
a mold unit configured to mold the melted resin injected from the injection unit into an injection molded product, receive the film on which the surface layer is formed from the print unit, and transfer the surface layer of the film to the injection molded product,
wherein the injection unit comprises an injection module configured to receive the melted resin and inject the melted resin into the mold unit, wherein, the injection module is further configured to evaporate and discharge a gas from the melted resin before the melted resin is injected, and
wherein the injection module includes:
a main body which is formed to have a cylindrical shape having an inner space and has a hollow and a wall in which a plurality of gas discharge holes penetrating the wall in a radial direction of the main body are formed to discharge the gas evaporated from the melted resin passing through the inner space to an outside, wherein the wall includes eject holes penetrating through the wall of the main body from a front end of the main body to a rear end of the main body in a longitudinal direction of the main body and intersecting the plurality of gas discharge holes;
a spray head coupled to a front end portion of the main body and including a nozzle configured to spray the melted resin supplied through the inner space of the main body;
a guide member which is installed along a central portion of the inner space of the main body in the longitudinal direction of the main body and in which a first guide groove and a second guide groove formed in the longitudinal direction are alternately disposed in parallel in an outer circumferential surface in a circumferential direction so as to guide the melted resin supplied from a rear end portion of the main body to flow to the front end portion of the main body, wherein a front end portion of the first guide groove is open, a rear end portion of the first guide groove is closed, a front end portion of the second guide groove is closed, and a rear end portion of the second guide groove is open so that the melted resin supplied from the rear end portion of the main body flows along the second guide groove, stops at the front end portion of the second guide groove, and overflows and is introduced into the first guide groove such that the gas included in the melted resin is evaporated when the melted resin overflows and is introduced into the first guide groove from the second guide groove;
a plurality of discharge members which are arranged in the inner space of the main body along the longitudinal direction of the main body to wrap an outer side of a section of the guide member in which the first guide groove and the second guide groove are formed and are fitted to the guide member to be adjacent to each other, wherein each discharge member has a flat ring shape having a hollow central portion and includes a first protrusion and a second protrusion which are formed to protrude from an outer side and an inner side of one surface of each discharge member in a circumferential direction to be spaced apart from each other with a gas chamber formed in a separation space therebetween, wherein a plurality of discharge holes are formed in the first protrusion, a plurality of discharge slits radially formed are provided in the second protrusion, and a height of the second protrusion is lower than a height of the first protrusion so that the gas evaporated from the melted resin is allowed to be introduced into the gas chamber;

a hub box which is formed to have a ring shape along the front end portion of the main body and communicates with the eject holes of the main body;

a suction member provided with a plurality of suction hoses radially connected to the hub box to suction air of the eject holes using a vacuum suction force of a vacuum pump, wherein the suction member is configured to generate an air flow from the rear end of the main body to the front end of the main body in the eject holes using the vacuum suction force of the vacuum pump so that the gas included in the melted resin is guided to be evaporated and discharged with air flowing through the eject holes; and porous wire bars manufactured by weaving fine wires, wherein each porous wire bar is inserted into each eject hole along the longitudinal direction of the main body and intersects the plurality of gas discharge holes so that the vacuum suction force of the suction member uniformly acts in the inner space of the main body by the porous wire bars.

\* \* \* \* \*